(12) United States Patent
Hou et al.

(10) Patent No.: US 9,111,077 B2
(45) Date of Patent: Aug. 18, 2015

(54) METHOD AND DEVICE FOR REALIZING REMOTE LOGIN

(71) Applicant: Sangfor Networks Company Limited, Shenzhen (CN)

(72) Inventors: Lijun Hou, Shenzhen (CN); Xing Li, Shenzhen (CN); Mingming Zhang, Shenzhen (CN)

(73) Assignee: SANGFOR NETWORKS COMPANY LIMITED, Shenzhen (CN)

( * ) Notice: Subject to any disclaimer, the term of this patent is extended or adjusted under 35 U.S.C. 154(b) by 15 days.

(21) Appl. No.: 13/721,035

(22) Filed: Dec. 20, 2012

(65) Prior Publication Data

US 2013/0185781 A1 Jul. 18, 2013

(30) Foreign Application Priority Data

Jan. 16, 2012 (CN) .......................... 2012 1 0012145

(51) Int. Cl.
*G06F 21/31* (2013.01)
*G06F 21/41* (2013.01)

(52) U.S. Cl.
CPC ............... *G06F 21/316* (2013.01); *G06F 21/41* (2013.01)

(58) Field of Classification Search
CPC ....... G06F 21/316; G06F 21/41; G06F 21/31; H04L 63/0815
USPC .......................................................... 726/6, 8
See application file for complete search history.

(56) References Cited

U.S. PATENT DOCUMENTS

| | | | | |
|---|---|---|---|---|
| 5,491,752 | A * | 2/1996 | Kaufman et al. | 380/30 |
| 5,870,386 | A * | 2/1999 | Perlman et al. | 370/256 |
| 7,233,997 | B1 * | 6/2007 | Leveridge et al. | 709/229 |
| 2002/0019764 | A1 * | 2/2002 | Mascarenhas | 705/10 |
| 2003/0182551 | A1 * | 9/2003 | Frantz et al. | 713/170 |
| 2004/0199795 | A1 * | 10/2004 | Grewal et al. | 713/202 |
| 2004/0250118 | A1 * | 12/2004 | Andreev et al. | 713/201 |
| 2005/0240763 | A9 * | 10/2005 | Bhat et al. | 713/169 |
| 2006/0026197 | A1 * | 2/2006 | Quinn et al. | 707/103 R |
| 2006/0048214 | A1 * | 3/2006 | Pennington et al. | 726/5 |
| 2007/0113269 | A1 * | 5/2007 | Zhang | 726/4 |
| 2008/0046349 | A1 * | 2/2008 | Elberg et al. | 705/35 |
| 2008/0098464 | A1 * | 4/2008 | Mizrah | 726/5 |
| 2008/0243693 | A1 * | 10/2008 | Thrasher et al. | 705/51 |
| 2009/0007248 | A1 * | 1/2009 | Kovaleski | 726/8 |
| 2009/0249439 | A1 * | 10/2009 | Olden et al. | 726/1 |
| 2010/0293246 | A1 * | 11/2010 | Urazoe et al. | 709/217 |
| 2011/0162046 | A1 * | 6/2011 | Forster et al. | 726/4 |
| 2011/0179466 | A1 * | 7/2011 | Hamada | 726/3 |
| 2012/0011358 | A1 * | 1/2012 | Masone | 713/153 |
| 2012/0204249 | A1 * | 8/2012 | Gonzalez et al. | 726/8 |
| 2012/0233675 | A1 * | 9/2012 | Hird | 726/6 |
| 2013/0151996 | A1 * | 6/2013 | Nario et al. | 715/760 |
| 2013/0159890 | A1 * | 6/2013 | Rossi | 715/762 |

* cited by examiner

*Primary Examiner* — Matthew Smithers

(57) ABSTRACT

The present disclosure provides a method and a device for realizing remote login. The method includes: a terminal server responding to a login request to an internal system from an end user, and recording and saving login information of the end user for logging in to the internal system; and the terminal server judging and analyzing the way the end user logs in to the internal system according to the login information and pre-configured rule, and allowing the end user to log in to and access the internal system if the analyzed result matches the pre-configured rule. The method and device allows for implementations of the SSO authentication and user bind authentication on the aspect of the data flow in the terminal server, simplifies the process of logging in to and accessing the internal system, and improves the information security of the system.

8 Claims, 5 Drawing Sheets

METHOD AND DEVICE FOR REALIZING REMOTE LOGIN

BACKGROUND

1. Technical Field

The present disclosure relates to computer technologies and, particularly, to a method and a device for realizing remote login.

2. Description of Related Art

Remote application publication belongs to application virtualization technology, which separates the human-machine interactive logic (application interfaces, operations of keyboard and mouse, audio inputs and outputs, card readers, and printouts) from computational logic; when users access one application with the server thereof being virtualized, the user end only needs to send the remote desktop protocol to the server end via RDP/ICA (Remote Desktop Protocol/ Independent computing Architecture) to the server end. The server end thereafter creates independent conversation space for the user in which the computation logic of the application program is executed to send the changed human-machine interactive logic to devices of the user end. The changed human-machine interactive logic can be displayed in the corresponding display of the user end, allowing the user to feel like accessing the local application program.

As the internal applications in the company increases, hundreds of business systems are used within a large-scale company. Thus, the same employee in the company may use dozens of, even hundreds of accounts and passwords, which brings forward standard authentication plans of the different kinds of business systems. Among the standard authentication methods, single sign-on (SSO) and user bind are the two most commonly used kinds of authentication methods.

In the traditional SSO authentication, after the user logs in and is centrally authenticated, the control in the client is used to simulate the user input or the server end is used for inserting authentication data flow which can simulate the user input when the user is accessing other applications, which saves the user the trouble of inputting the user name and the password again when accessing the other applications. Another traditional SSO authentication replaces the manual input by plug-ins in the client after the information of the application program is recorded. In this type of SSO authentication, a central authentication issued server is required and the plug-ins are installed in the client. However, after using the remote application, there is no authentication issued server and there are various clients, making it impossible to add plug-ins which can be initiated as the application program is started in the client or terminal sever to simulate the user input. The traditional user bind authentication logs in to and gets access to the business systems by analyzing the data flow of the client on aspect of the data flow of the client. Since the traditional SSO authentication and the traditional user bind authentication cannot analyze the data flow in the terminal server, therefore, remote login cannot be finished by using the SSO authentication and the user bind authentication on the aspect of data flow of the terminal server.

SUMMARY

The present disclosure provides a method for realizing remote login which can realize the remote login on the aspect of data flow by matching and analyzing the data flow in the terminal server.

The method for realizing remote login includes:

step 01, a terminal server responding to a login request to an internal system from an end user, and recording and saving login information of the end user for logging in to the internal system; and step 02, the terminal server judging and analyzing the way the end user logs in to the internal system according to the recorded and saved login information and according to pre-configured rule, and allowing the end user to log in to and access the internal system if the analyzed result matches the pre-configured rule.

Preferably, the method further includes the following step:

step S03, the terminal server showing an access result to the end user.

Preferably, the in the step S02, the terminal server judges the way the end user logs in to the internal system by judging whether the end user logs in to the internal system by SSO authentication.

Preferably, the step S02 specifically includes:

the terminal server judging whether there is SSO information in the internal system according to the recorded and saved login information and according to the pre-configured rule, and automatically inputting the login information of the end user if there is SSO information in the internal system, otherwise requiring the end user to manually input the login information;

analyzing the data flow and judging whether the analyzed result matches the pre-configured rule or not after the login information is successfully input, and allowing the end user to log in to and access the internal system if the analyzed result matches the pre-configured rule.

Preferably, the terminal sever records and saves the login information by determining a respective unique number of a user name input box, a password input box, and an OK button in the corresponding program in the terminal server when the end user logs in to the internal system.

The present disclosure further provides a device for realizing remote login, including:

a login recording module, configured for responding to a login request to an internal system from an end user, and recording and saving login information of the end user for logging in to the internal system; and a central authentication module, configured for judging and analyzing the way the end user logs in to the internal system according to the recorded and saved login information and according to pre-configured rule, and allowing the end user to log in to and access the internal system if the analyzed result matches pre-configured rule.

Preferably, the device further includes a result showing module configured for showing an access result to the end user.

Preferably, the central authentication module is further configured for judging whether the end user logs in to the internal system by SSO authentication.

Preferably, the central authentication module includes a SSO authentication unit and a user bind authentication unit; the SSO authentication unit is configured for judging whether there is SSO information in the internal system according to the recorded and saved login information and according to the pre-configured rule, for automatically inputting the login information if there is SSO information in the internal system, and for requiring the end user to manually input the login information if there is no SSO information; the user bind authentication unit is configured for analyzing the data flow in the terminal server and judging whether the analyzed result matches the pre-configured rule after the login information is input, and allowing the end user to log in to and access the internal system if the analyzed result matches the internal system.

Preferably, the login recording module records and saves the login information by determining a respective unique number of a user name input box, password input box, an OK button in the corresponding program in the terminal server when the end user logs in to the internal system.

The method and device for realizing remote login of the present disclosure realize the remote login by analyzing the data flow in the terminal server and the pre-configured rule, thereby allowing for the implementations of the SSO authentication and user bind authentication on the aspect of the data flow in the terminal server, simplifying the process that the user logs in to and access the internal system, and improving the information security of logging in to and access the remote application system.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
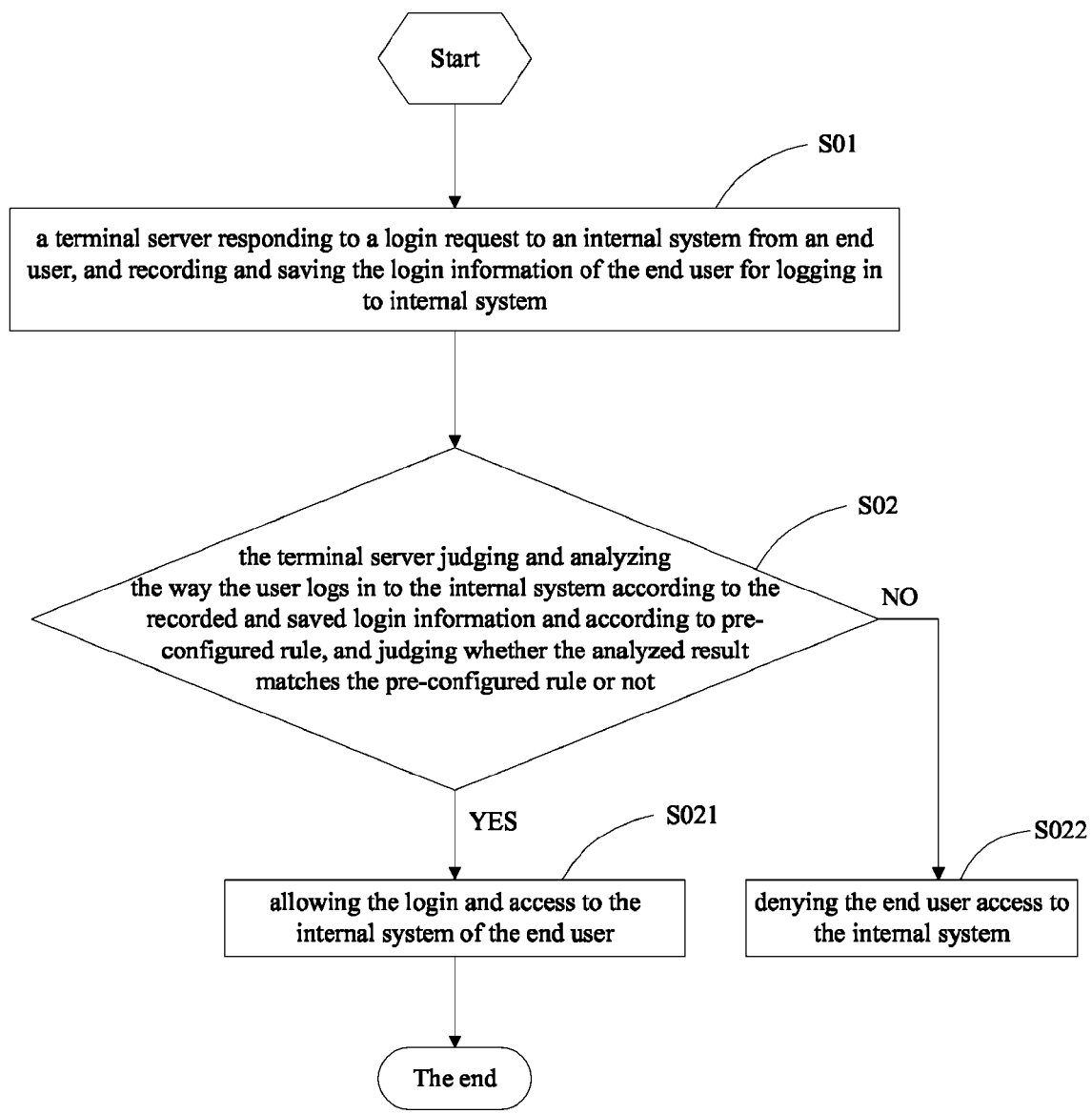
FIG. 1 is a flow chart of a method for realizing remote login in accordance with a first embodiment of the present disclosure.

Referring to FIG. 1, which is a flow chart of a method for realizing remote login in accordance with a first embodiment of the present disclosure. The method includes the following steps:

Step S01, a terminal server responding to a login request to an internal system from an end user, and recording and saving the login information of the end user for logging in to internal system.

After the end user logs in to the terminal server successfully according to preset user name and password, the terminal server responds to the login request to the internal system from the end user, collects the login information of the end user for logging in to the internal system, records the login information, and saves the login information in a configuration file of the terminal server. Preferably, the remote client can be a PC (Personal Computer), a notebook computer, a PDA (Personal Digital Assistant), or any other device which can be connected to the terminal server safely via the internet. The reason that the terminal server records and saves the login information is that, each user interface element of each remoter client on each program interface is given a unique number. By recording the login information, the unique serial numbers of the input boxes of the user name and the password and the OK button of a corresponding program in the terminal server corresponding to the end user can be determined By using a login recording program which is preferably a login recording assistant, when an end user logs in to an application program in the terminal server corresponding to the end user, the unique serial numbers of the input boxes of the input information and the buttons corresponding to the application program are collected and saved in the login configuration files of the terminal server which corresponds to the end user, thus, a control can input corresponding information into the corresponding input box when performing the login authentication of the end user.

Step S02, the terminal server judging and analyzing the way the user logs in to the internal system according to the recorded and saved login information and according to pre-configured rule, and judging whether the analyzed result matches the pre-configured rule or not. If the analyzed result matches the pre-configured rule, step S021 is performed, otherwise step S022 is performed.

Step S021, allowing the login and access to the internal system of the end user.

Step 5022, denying the end user access to the internal system.

After the login recording program finishes recording the login information of the end user for logging in to the internal system, the control is installed in the terminal server. After the terminal server responds to the login request to the internal system from the end user, the control judges the way that the user logs in to the internal system according to the recorded and saved login information and according to the pre-configured rule. In the embodiment, preferably, the method that the user logs in to the internal system includes single sign-on (SSO) and user bind. The control analyzes the data flow in the terminal server and determines whether the analyzed result matches the pre-configured rule. If the analyzed result matches the pre-configured rule, the end user is allowed login and access to the internal system. If the analyzed result does not match the pre-configured rule, the end user is denied login to the internal system.

By recording and saving the login information of the end user for logging in to the internal system and analyzing the data flow in the terminal server, the method for realizing remote login of the present disclosure allows the end user to log in to the internal system remotely and further get access to the internal system, simplifies the process that the user logs in to and access the internal system, and improves the safety of the system.

Figure 2:
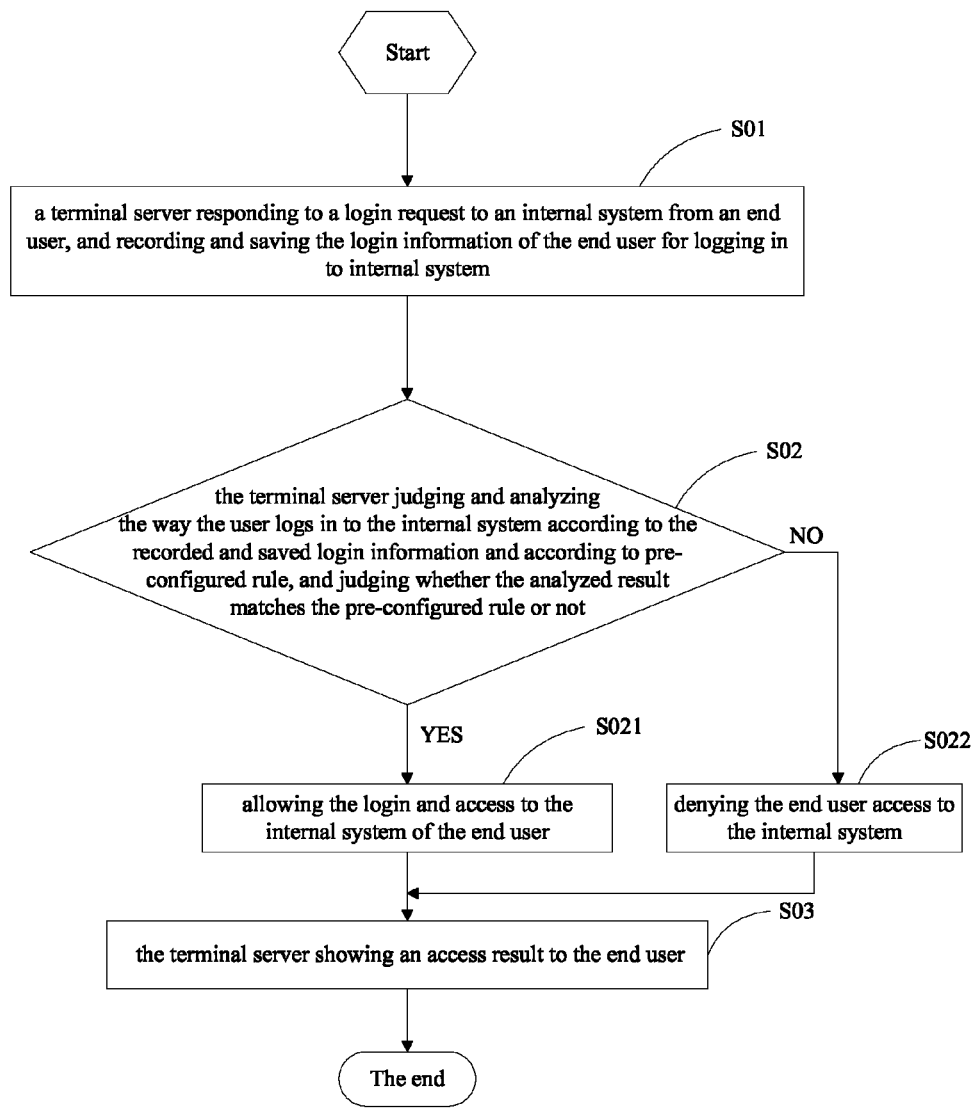
FIG. 2 is a flow chart of the method for realizing remote login in accordance with a second embodiment of the present disclosure.

Referring to FIG. 2, which is a flow chart of the method for realizing remote login in accordance with a second embodiment of the present disclosure. As shown in FIG. 2, in the embodiment, the method further includes:

Step S03, the terminal server showing an access result to the end user.

The control in the terminal server analyzes the data flow and judges whether the analyzed result matches the pre-configured rule or not according to the recorded and saved login information of the end user for logging in to the internal system and the pre-configured rule. If the analyzed result matches the pre-configured rule, the end user is allowed access to the internal system and the terminal server shows an interface indicating that the end user successfully gets access to the internal system. If the analyzed result does not match the pre-configured rule, the end user is denied access to the internal system and the terminal server shows the interface indicating that the end user is denied access to the internal system.

The method for realizing remote login of the present disclosure shows the access result to the client via the terminal server, which completes and humanizes the remote login process.

Figure 3:
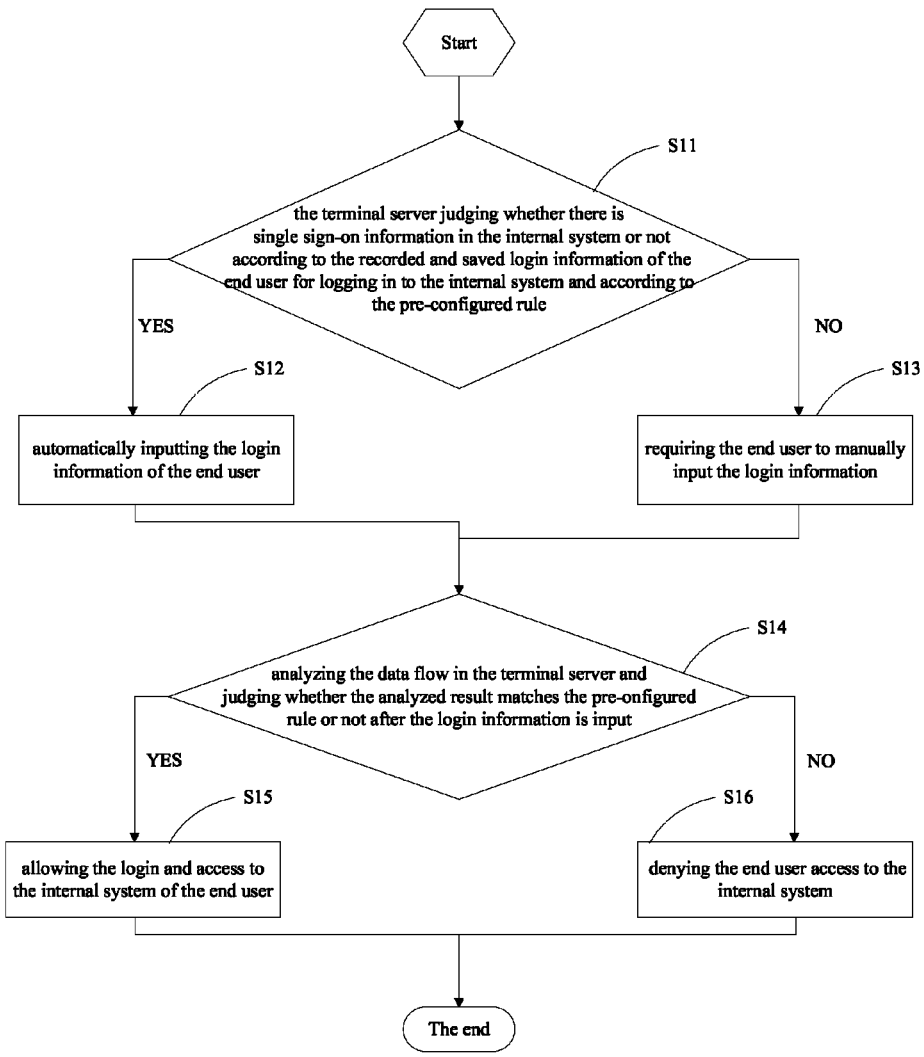
FIG. 3 is a flow chart of the step that the terminal server centrally authenticates the remote login of the end user of the method of FIG. 1.

Referring to FIG. 3, which is a flow chart of the step that the terminal server centrally authenticates the remote login of the end user. As shown in FIG. 3, in the method for realizing remote login of the present disclosure, the step that the terminal server centrally authenticates the remote login of the end user specifically includes:

Step S11, the terminal server judging whether there is SSO information in the internal system or not according to the recorded and saved login information of the end user for logging in to the internal system and according to the pre-configured rule, if yes, Step S12 is performed, otherwise Step S13 is performed.

Step S12, automatically inputting the login information of the end user.

Step S13, requiring the end user to manually input the login information.

Step S14, analyzing the data flow in the terminal server and judging whether the analyzed result matches the pre-configured rule after the login information is input. If the analyzed result matches the pre-configured rule, step S15 is performed, otherwise Step S16 is performed.

Step S15, allowing the login and access to the internal system of the end user.

Step S16, denying the end user access to the internal system.

The SSO authentication allows a user to get access to all the mutual-trust application systems via one login. The SSO authentication includes a login mechanism which reflects the login to other applications such that the login can be used for the same user. The SSO authentication is the popular solution for company integrated business. The user can choose different ways to initiate the SSO operation according to requirements, for example, the user can initiate the SSO operation by using auto-form filling. After the SSO authentication is successfully implemented, the user can set user name and password according to requirements. If the user needs to set a slave user name and a slave password, the system can set different slave user names and passwords according to different application programs and different user accounts.

In the embodiment, after the login recording program finishes recording the login information of the end user for logging in to the internal system, the control is installed in the terminal server. When the end user accesses the internal system via the remote application publication client, the control in the terminal server judges whether there is SSO information of the internal system according to the recorded and saved login information of the end user and according to the pre-configured rule. If there is SSO information of the internal system in the terminal server, the login information of the end user is automatically input; otherwise, the end user is required to input the login information manually.

In the user bind authentication, different binding ways can be chosen in the login interface, for example, the master user name and the slave user name can be bound by analyzing data package or bound in combination with the SSO authentication. The format of the data package used for binding the master user name and salve user name can be TCP (Transmission Control Protocol), HTTP (Hyper Text Transfer Protocol), FTP (File Transfer Protocol), simple universal plaintext, or other suitable formats. Since in the user bind authentication, the master user name and the slave user name can be bound by filtering data flow, therefore, the rule of the user bind authentication can be configured by setting different formats of data flows used for filtering different protocols. That is, a certain field can be set to match the user name and another field can be set to match the password. The terminal server instructs the control to analyze the data flow according to the set rule for binding the master and slave user name.

In the embodiment, after the end user inputs the login information, the control analyzes the data flow in the terminal server and judges whether the analyzed result matches the pre-configured rule. If the analyzed result matches the pre-configured rule, the end user is allowed to log in to and access the internal system. If the analyzed result does not match the pre-configured rule, the end user is denied access to the internal system. In this way, the user name bind authentication is finished. Specifically, in a preferred embodiment, when the end user accesses the internal system via the terminal server by using TCP connection, the control intercepts and analyzes the data flow of the corresponding program in the terminal server. The control disconnects the TCP connection and denies the user access when determining that the analyzed result does not match the preset rule, thereby finishing the user bind authentication.

The method for realizing remote login of the present disclosure analyzes the data flow in the terminal server, thereby allowing for the implementations of the SSO authentication and user bind authentication on the aspect of the data flow in the user remote applications, and improving the information security of logging in to and access the remote application system.

Figure 4:
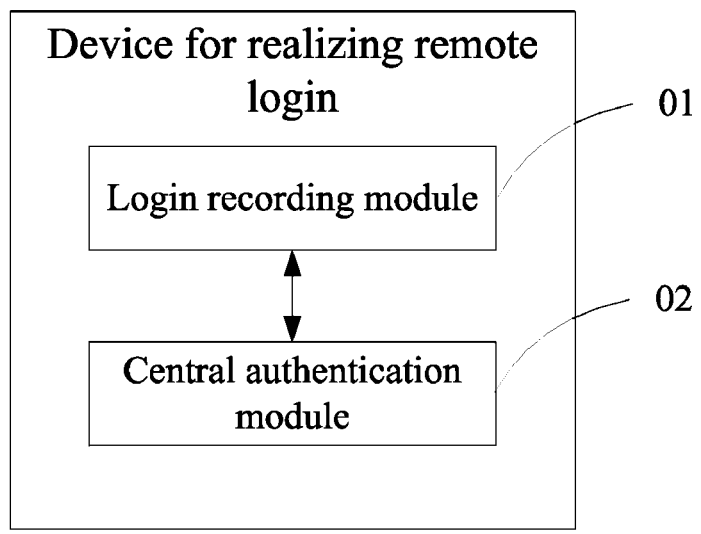
FIG. 4 is a schematic view of a device for realizing remote login in accordance with a first embodiment of the present disclosure.

Referring to FIG. 4, a device for realizing remote login, in accordance with a first embodiment of the present disclosure, is schematically shown. As shown in FIG. 4, in the embodiment, the device includes a login recording module 01 and a central authentication module 02.

The login recording module 01 is configured for responding to a login request to the internal system from an end user, and recording and saving the login information of the end user for logging in to the internal system.

After the end user logs in to the terminal server successfully according to preset user name and password, the login recording module 01 collects the login information of the end user for logging in to the internal system, records the login information, and saves the login information in a configuration file of the terminal server. Preferably, the remote client can be a PC (Personal Computer), a notebook computer, a PDA (Personal Digital Assistant), or any other device which can be connected the terminal server safely via the internet. The reason that the login recording module 01 records and saves the login information is that, each user interface element of each remoter client on each program interface is given a unique number. By recording the login information of the end user for logging in to the internal system, the unique serial numbers of the input boxes of the user name and the password and the OK button of a corresponding program in the terminal server corresponding to the end user can be determined By using a login recording program which is preferably a login recording assistant, when an end user logs in to an application program in the terminal server corresponding to the end user, the unique serial numbers of the input boxes of the input information and the buttons corresponding to the application program are collected and saved in the login configuration files of the terminal server which corresponds to the end user, thus, a control can input corresponding information into the corresponding input box when performing the login authentication of the end user.

The central authentication module 02 is configured for judging and analyzing the way the user logs in to the internal system according to the recorded and saved login information of the end user for logging in to the internal system and according to pre-configured rule. If the analyzed result matches the pre-configured rule, the central authentication module 02 allows the end user to log in to and access the internal system.

After the login recording module 01 finishes recording the login information, the control is installed in the central authentication module 02 of the terminal server. After the end user logs in to the terminal server, the central authentication module 02 responds to the login request to the internal system from the end user and judges the way that the user logs in to the internal system according to the recorded and saved login information and according to the pre-configured rule. In the embodiment, preferably, the way that the user logs in to the internal system includes SSO authentication and user bind authentication. After the central authentication module 02 analyzes the data flow, if the analyzed result matches the pre-configured rule, the end user is allowed login and access to the internal system; otherwise, if the analyzed result does not match the pre-configured rule, the end user is denied login to the internal system.

The central authentication module 02 is further configured for judging whether the user logs in to the internal system via the SSO authentication or not. If the central authentication module 02 determines that the user logs in to the internal system via the SSO authentication, the login information of the end user is automatically input. Otherwise, the end user is required to manually input the login information.

By using the login recording module 01 to record and save the login information of the end user for logging in to the internal system and by using the central authentication module 02 to analyze the data flow in the terminal server, the device for realizing remote login of the present disclosure allows the end user to log in to internal system remotely and further get access to the internal system, simplifies the process that the user logs in to and access the internal system, and improves the safety of the system.

Figure 5:
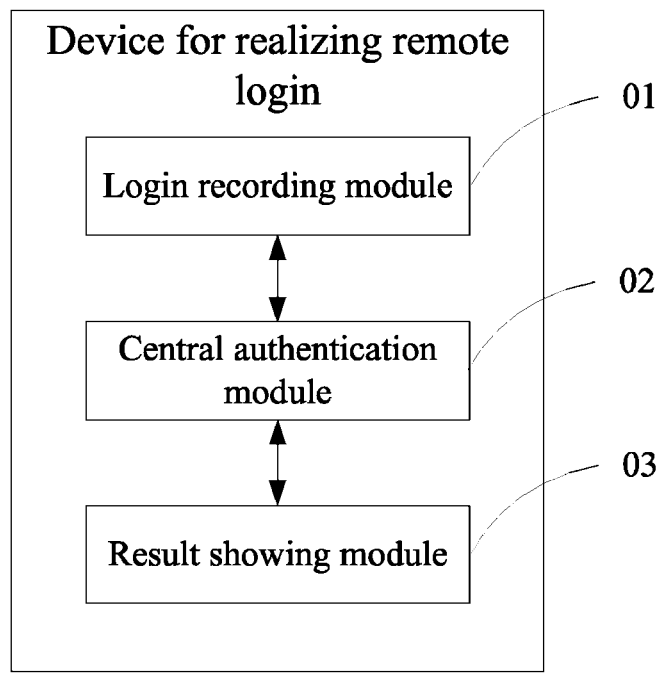
FIG. 5 is a schematic view of the device for realizing remote login in accordance with a second embodiment of the present disclosure.

Referring to FIG. 5, a device for realizing remote login in accordance with a second embodiment of the present disclosure, is schematically shown. As shown in FIG. 5, in the embodiment, the device further includes a result showing module 03.

The result showing module 03 is configured for showing an access result to the end user.

The central authentication module 02 in the terminal server analyzes the data flow and judges whether the analyzed result matches the pre-configured rule or not according to the login information recorded and saved by the login recording module 01 and according to the pre-configured rule. If the analyzed result matches the pre-configured rule, the end user is allowed access to the internal system and the result showing module 03 shows an interface indicating that the end user successfully gets access to the internal system. If the analyzed result does not match the pre-configured rule, the end user is denied access to the internal system and the result showing module 03 shows the interface indicating that the end user is denied access to the internal system.

The device for realizing remote login of the present disclosure shows the access result to the client via the terminal server, which completes and humanizes the remote login process.

Figure 6:
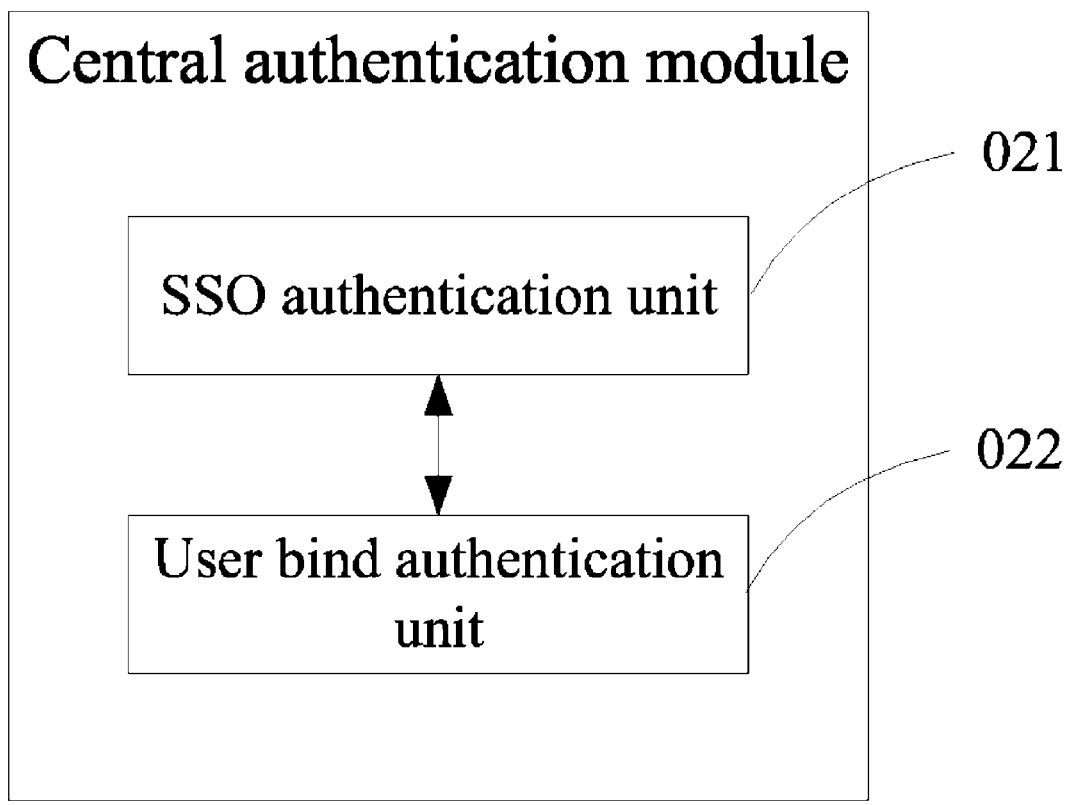
FIG. 6 is a schematic view of a central authentication module of the device of FIG. 4.

Referring to FIG. 6, the central authentication module 02 of the device for realizing remote login, is schematically shown. As shown in FIG. 6, the central authentication module 02 specifically includes a SSO authentication unit 021 and a user bind authentication unit 022.

The SSO authentication unit 021 is configured for judging whether there is SSO information in the internal system according to the recorded and saved login information of the end user for logging in to the internal system and according to the pre-configured rule. If there is SSO information in the terminal system, the login information of the end user is automatically input, otherwise the end user is required to manually input the login information.

The user bind authentication unit 022 is configured for analyzing the data flow in the terminal server and judging whether the analyzed result matches the pre-configured rule after the login information is input. If the analyzed result matches the pre-configured rule, the end user is allowed to log in to and access the internal system.

Specifically, in a preferred embodiment, when the end user accesses the internal system via the terminal server by using TCP connection after inputting the login information by the SSO authentication unit 021, the user bind authentication unit 022 intercepts and analyzes the data flow of the corresponding program in the terminal server. The user bind authentication unit 022 disconnects the TCP connection and denies the user access when determining that the analyzed result does not match the preset rule, thereby finishing the user bind authentication.

The device for realizing remote login of the present disclosure analyzes the data flow in the terminal server, thereby allowing the end user to log in to and access the internal system, simplifying the process that the user logs in to and access the internal system, and improving the safety of the system.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A method for realizing remote login, comprising:
responding to a login request to an internal system from an end user, and recording and saving login information of the end user for logging in to the internal system at a terminal server; and
judging and analyzing the way the end user logs in to the internal system according to the recorded and saved login information and according to pre-configured rule, and allowing the end user to log in to and access the internal system if the analyzed result matches the pre-configured rule at the terminal server;
wherein the terminal server records and saves the login information by determining a unique number of a user name input box, a unique number of a password input box, and a unique number of an OK button in each corresponding program in the terminal server when the end user logs in to the internal system; and unique serial numbers of input boxes and buttons corresponding to multiple programs are collected and saved in a login configuration file of the terminal server which corresponds to the end user, and a control installed in the terminal server inputs corresponding information into a corresponding input box when performing login authentication of the end user and analyzes a data flow in the terminal server to determine whether the analyzed result matches the pre-configured rule;

wherein judging and analyzing the way the end user logs in to the internal system according to the recorded and saved login information and according to the pre-configured rule, and allowing the end user to log in to and access the internal system if the analyzed result matches the pre-configured rule at the terminal server comprises:

judging whether there is SSO information in the internal system according to the recorded and saved login information and according to the pre-configured rule, and automatically inputting the login information of the end user if there is SSO information in the internal system, otherwise requiring the end user to manually input the login information;

analyzing the data flow and judging whether the analyzed result matches the pre-configured rule or not after the login information is successfully input, and allowing the end user to log in to and access the internal system if the analyzed result matches the pre-configured rule at the terminal server; and wherein the control analyzes the data flow according to a set rule for binding a master user name and a slave user name; the set rule for binding a master user name and a slave user name is configured by setting different formats of data flows used for filtering different protocols and a field is set to match the user name and another field is set to match the password.

2. The method of claim 1 further comprising the following step:

showing an access result to the end user at the terminal server.

3. The method of claim 1, wherein the terminal server judges the way the end user logs in to the internal system by judging whether the end user logs in to the internal system by single sign-on (SSO) authentication.

4. The method of claim 1, wherein the protocols are TCP (Transmission Control Protocol), HTTP (Hyper Text Transfer Protocol), FTP (File Transfer Protocol), or simple universal plaintext.

5. A device for realizing remote login, comprising:

a login recording module, configured for responding to a login request to an internal system from an end user, and recording and saving login information of the end user for logging in to the internal system; and a central authentication module, configured for judging and analyzing the way the end user logs in to the internal system according to the recorded and saved login information and according to pre-configured rule, and allowing the end user to log in to and access the internal system if the analyzed result matches pre-configured rule;

wherein the login recording module records and saves the login information by determining a unique number of a user name input box, a unique number of password input box, an a unique number of OK button in each corresponding program in the terminal server when the end user logs in to the internal system; and unique serial numbers of input boxes and buttons corresponding to multiple programs are collected and saved in a login configuration file of the terminal server which corresponds to the end user, and a control installed in the terminal server inputs corresponding information into a corresponding input box when performing login authentication of the end user and analyzes a data flow in the terminal server to determine whether the analyzed result matches the pre-configured rule;

wherein the central authentication module comprises a SSO authentication unit and a user bind authentication unit; the SSO authentication unit is configured for judging whether there is SSO information in the internal system according to the recorded and saved login information and according to the pre-configured rule, for automatically inputting the login information if there is SSO information in the internal system, and for requiring the end user to manually input the login information if there is no SSO information; the user bind authentication unit is configured for binding a master user name and a slave user name and analyzing the data flow in the terminal server and judging whether the analyzed result matches the pre-configured rule after the login information is input, and allowing the end user to log in to and access the internal system if the analyzed result matches the internal system; and wherein the control analyzes the data flow according to a set rule for binding the master user name and the slave user name; the set rule for binding the master user name and the slave user name is configured by setting different formats of data flows used for filtering different protocols and a field is set to match the user name and another field is set to match the password.

6. The device of claim 5 further comprising a result showing module configured for showing an access result to the end user.

7. The device of claim 5, wherein the central authentication module is further configured for judging whether the end user logs in to the internal system by single sign-on (SSO) authentication.

8. The device of claim 5, wherein the protocols are TCP (Transmission Control Protocol), HTTP (Hyper Text Transfer Protocol), FTP (File Transfer Protocol), or simple universal plaintext.

\* \* \* \* \*